(12) United States Patent
Fultz et al.

(10) Patent No.: US 6,927,678 B2
(45) Date of Patent: Aug. 9, 2005

(54) FLUID FILLED SEAT BLADDER WITH CAPACITIVE SENSORS FOR OCCUPANT CLASSIFICATION AND WEIGHT ESTIMATION

(75) Inventors: William W. Fultz, Carmel, IN (US); Dennis P. Griffin, Noblesville, IN (US); Mark A. Koors, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 137 days.

(21) Appl. No.: 10/643,044

(22) Filed: Aug. 18, 2003

(65) Prior Publication Data

US 2005/0043876 A1 Feb. 24, 2005

(51) Int. Cl.$^7$ ................................................ B60Q 1/00
(52) U.S. Cl. .................... 340/438; 340/667; 340/545.4; 701/45; 280/734
(58) Field of Search ............................. 340/438, 425.5, 340/439, 440, 450, 500, 501, 532, 667, 436, 457.1, 545.4; 701/45; 116/200; 346/40; 280/734–735

(56) References Cited

U.S. PATENT DOCUMENTS

| | | | |
|---|---|---|---|
| 4,584,625 A | 4/1986 | Kellogg ...................... 361/283 |
| 4,836,033 A | 6/1989 | Seitz ....................... 73/862.04 |
| 5,474,327 A | 12/1995 | Schousek | |
| 5,878,620 A | 3/1999 | Gilbert et al. ................ 73/172 |
| 5,942,695 A | 8/1999 | Verma et al. | |
| 5,984,349 A | * 11/1999 | Van Voorhies .............. 280/735 |
| 5,987,370 A | 11/1999 | Murphey et al. | |
| 6,006,386 A | 12/1999 | Mohaupt ................. 7/862.473 |
| 6,012,007 A | 1/2000 | Fortune et al. | |
| 6,021,863 A | * 2/2000 | Stanley ....................... 180/273 |
| 6,058,341 A | 5/2000 | Myers et al. | |
| 6,101,436 A | 8/2000 | Fortune et al. | |
| 6,138,067 A | 10/2000 | Cobb et al. | |
| 6,246,936 B1 | 6/2001 | Murphey et al. | |
| 6,329,913 B1 | 12/2001 | Shieh et al. ................ 340/561 |
| 6,329,914 B1 | 12/2001 | Shieh et al. ................ 340/561 |
| 6,360,618 B2 | 3/2002 | Anahid et al. | |
| 6,424,898 B2 | 7/2002 | Anishetty et al. | |
| 6,438,476 B1 | 8/2002 | Gray et al. | |
| 6,438,477 B1 | 8/2002 | Patterson et al. | |
| 6,448,789 B1 | 9/2002 | Kraetzl ....................... 324/658 |
| 6,479,766 B2 | 11/2002 | Gray et al. | |
| 6,499,359 B1 | 12/2002 | Washeleski et al. ... 73/862.473 |
| 6,542,802 B2 | 4/2003 | Gray et al. | |
| 6,578,871 B2 | 6/2003 | Gray et al. | |
| 6,584,387 B1 * | 6/2003 | Norton ........................ 701/45 |
| 6,587,770 B1 | 7/2003 | Gray et al. | |
| 6,591,685 B2 | 7/2003 | Kraetzl et al. ................ 73/718 |
| 6,604,426 B2 | 8/2003 | Kraetzl ....................... 73/724 |
| 6,674,024 B2 * | 1/2004 | Cech et al. .................. 177/144 |
| 6,792,342 B2 * | 9/2004 | Breed et al. .................. 701/45 |
| 6,825,765 B2 * | 11/2004 | Stanley et al. .............. 340/561 |

* cited by examiner

*Primary Examiner*—Jeffery Hofsass
*Assistant Examiner*—Eric Blount
(74) *Attorney, Agent, or Firm*—Stefan C. Chmielewski

(57) ABSTRACT

A fluid-filled seat bladder assembly includes multiple capacitive sensing elements for detecting variation in bladder deformation due to occupant weight. The bladder is defined by upper and lower elastomeric sheets that are peripherally sealed by welding, and the capacitive sensors are defined by metalized films adjoining the upper and lower elastomeric sheets. The bladder fluid separating the upper and lower metalized films acts as a dielectric material, and the capacitance or electric field coupling of each sensor increases when the separation between the respective upper and lower films decreases due occupant seat weight. The cumulative change in capacitance or electric field coupling reflects the total seated weight, and the individual capacitance or electric field coupling changes provide a profile of the pressure distribution across the seat for improved occupant classification. The metalized films may be located exterior of the bladder, or may be are formed on interior surfaces of the upper and lower elastomeric bladder sheets.

10 Claims, 6 Drawing Sheets

FLUID FILLED SEAT BLADDER WITH CAPACITIVE SENSORS FOR OCCUPANT CLASSIFICATION AND WEIGHT ESTIMATION

TECHNICAL FIELD

The present invention is directed to a fluid-filled seat bladder for vehicle occupant classification and weight estimation, and more particularly to a capacitive sensing arrangement for the seat bladder.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to classify the occupant. In particular, vehicle manufacturers want the ability to reliably distinguish between a $5^{th}$ percentile female occupant, a seated child, and a child or infant seat. Typically, normal energy deployment is enabled for a $5^{th}$ percentile female, reduced energy deployment is enabled for a seated child, and deployment is disabled for a child seat or infant seat.

Although various ways of estimating occupant classification and weight have been devised, perhaps the most simple and cost-effective way involves installing a fluid-filled bladder in or under the bottom foam cushion of the vehicle seat, and measuring the fluid pressure in the bladder with a pressure sensor. Exemplary systems of this type are disclosed, for example, in the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., and incorporated herein by reference. As disclosed in the above patents, limited occupant classification can be achieved by designing the bladder to tailor its sensitivity based on pressure distribution data, and by analyzing variation in the measured pressure. However, this procedure entails an extensive calibration effort for each different seat design, and necessarily results in a proliferation of bladder designs. It is also known, as described in the U.S. Pat. No. 6,578,871 to Gray et al., to divide the seat bladder into multiple fluid-filled chambers corresponding to different areas of the seat cushion, and to separately measure the fluid pressure in each chamber. While the multiple chamber approach enables improved occupant classification based on weight distribution, the use of multiple pressure sensors is generally cost prohibitive. Accordingly, what is needed is a more cost-effective and less calibration-intensive way of determining the distribution of pressure due to occupant weight in a fluid-filled seat bladder.

SUMMARY OF THE INVENTION

The present invention is directed to an improved fluid-filled seat bladder assembly for occupant classification and weight estimation, where the bladder assembly includes multiple capacitance or electric field coupling sensing elements for detecting variation in bladder deformation due to occupant weight. The bladder is defined by upper and lower elastomeric sheets that are peripherally sealed by welding, and the capacitive sensors are defined by metalized films adjoining the upper and lower elastomeric sheets. The bladder fluid separating the upper and lower metalized films acts as a dielectric material, and the capacitance of each sensor increases when the separation between the respective upper and lower films decreases due occupant seat weight. The cumulative change in capacitance reflects the total seated weight, and the individual capacitance changes provide a profile of the pressure distribution across the seat for improved occupant classification. The metalized films may be located exterior of the bladder, or may be are formed on interior surfaces of the upper and lower elastomeric bladder sheets.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
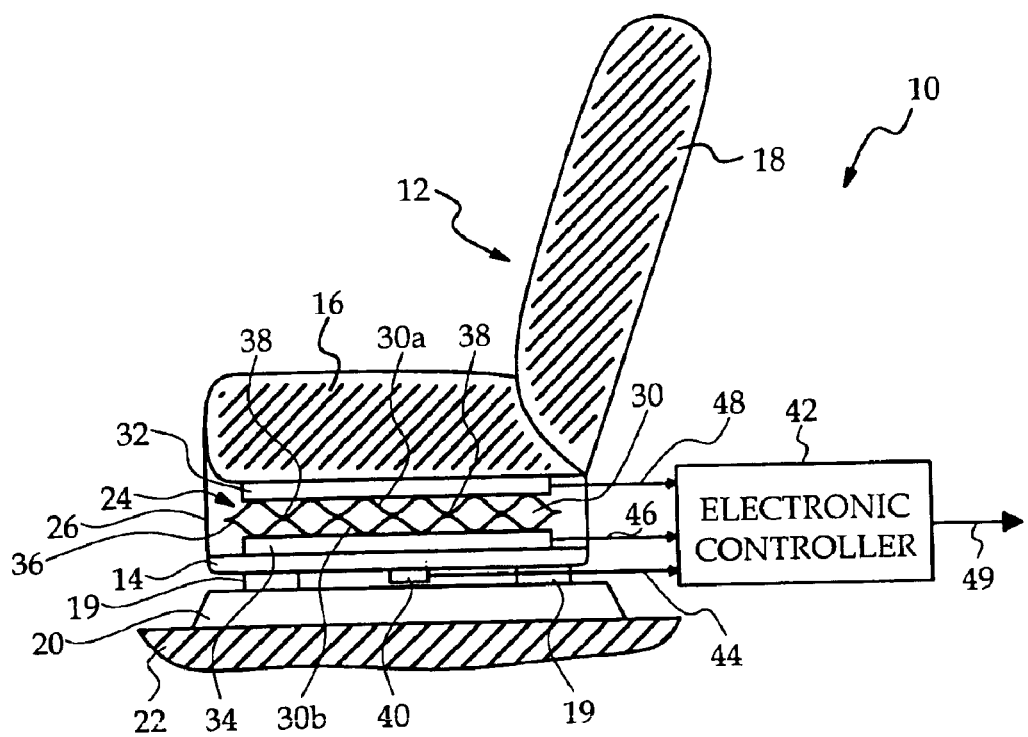
FIG. 1 is a diagram of an occupant classification and weight estimation system incorporating an electronic controller and a bladder assembly according to this invention.

Referring to the drawings, and particularly to FIG. 1, the reference numeral 10 generally designates a vehicle occupant classification and weight estimation system for a vehicle seat 12. The seat 12 includes a rigid frame and spring suspension 14, a bottom foam cushion 16 and a back foam cushion 18. A set of posts 19 integral to the frame 14 attach the seat 12 to pair of tracks 20 (only one of which is shown in FIG. 1), which in turn, are secured to the vehicle floor 22. A bladder assembly 24 is sandwiched between the bottom cushion 16 and the suspension elements of frame 14 for the purpose of determining occupant classification and weight, as explained below. Finally, a fabric cover 26 envelopes the cushion 16, bladder assembly 24 and frame 14.

The bladder assembly 24 comprises fluid-filled elastomeric bladder 30, an upper pad 32 disposed between the bladder 24 and the bottom cushion 16, and a lower pad 34 disposed between the bladder 24 and the seat frame 14. Upper and lower pads are ordinarily included in a seat bladder assembly to protect the bladder 30 from puncture damage, to improve occupant weight distribution, and to provide a uniform reaction surface for the bladder 30. The bladder 30 has a continuous weld 36 about its periphery and contains a fluid such as silicone which is non-corrosive and not subject to freezing or break-down at extreme ambient temperatures. Also, the upper and lower layers 30a, 30b of bladder 30 may be joined at various locations by spot welding, as indicated by the reference numeral 38; this reduces the overall fluid volume, and provides a means of shaping the bladder sensitivity, as explained in the aforementioned U.S. Pat. No. 6,101,436. The fluid pressure in the bladder 30 is measured by a pressure sensor 40, and a signal indicative of the measured pressure is provide to an electronic controller 42 via line 44. According to this invention, the bladder assembly 24 additionally includes an array of capacitive sensing elements for detecting variation in deformation of the bladder 30 due to occupant weight, and electrical signals indicative of such variation are provided to controller 42 via line 46 and cable 48. As explained below, the cumulative change in capacitance of the sensing elements reflects the total seated weight (which may be validated by the pressure signal on line 44), and the individual capacitance changes provide a profile of the pressure distribution across the seat 12 for improved occupant classification. Controller 42 produces an electrical output signal indicative of the weight estimation on data bus 49; such output signal may be used, for example, as a factor in determining whether and how forcefully to deploy air bags or other pyrotechnically deployed restraints in a crash event.

Figure 2B:
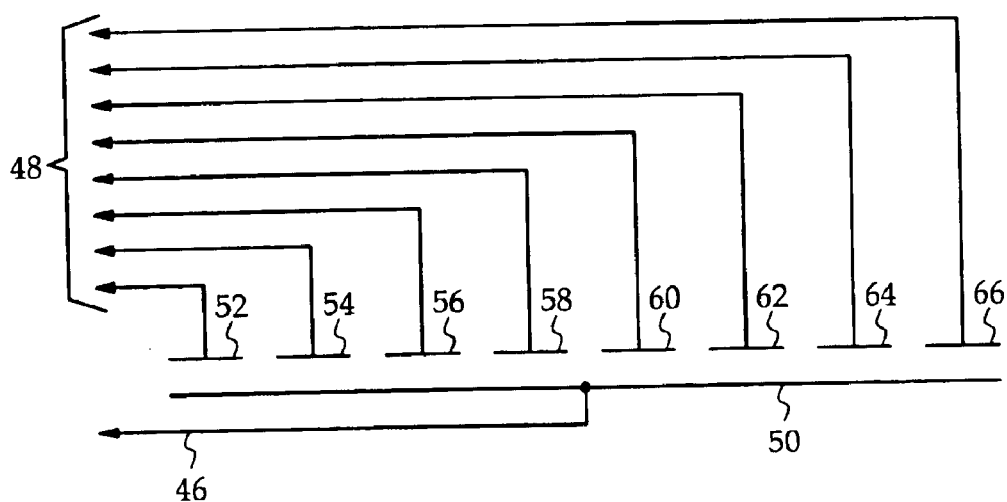
FIG. 2B is an equivalent circuit diagram for the bladder assembly of FIG. 2A.
Figure 2A:
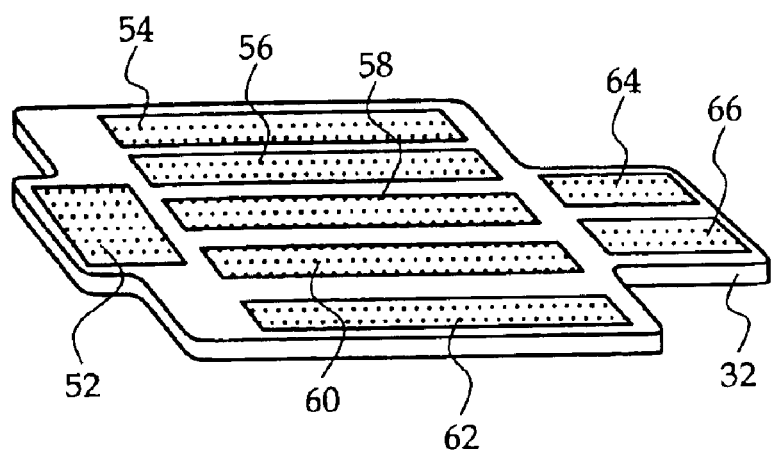
FIG. 2A an exploded view of the bladder assembly of FIG. 1 according to a first embodiment of this invention.
Figure 2A:
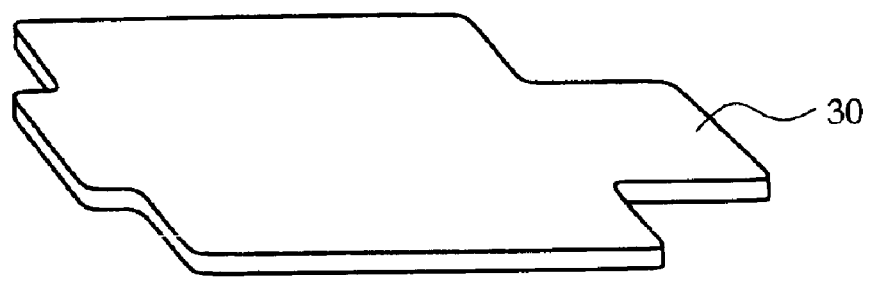
Figure 2A:
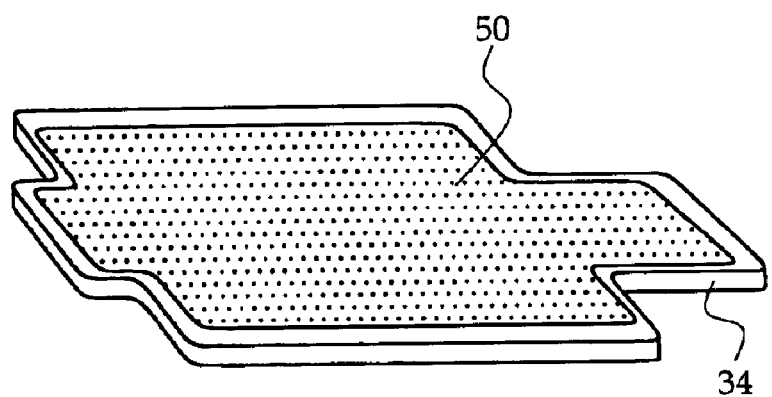

FIGS. 2A and 2B depict a first embodiment of the invention in which the upper and lower pads 32, 34 are utilized as substrates for supporting the capacitive sensor elements. As seen in the exploded view of FIG. 2A, the lower pad 34 supports a ground plane film 50 covering substantially the entire area beneath the bladder 30, and the upper pad 32 supports a number of regional metal films 52, 54, 56, 58, 60, 62, 64, 66 that overlie the ground plane plate 50. The various metal films 50, 52, 54, 56, 58, 60, 62, 64, 66 may be formed of thin copper foil, for example, and adhered to the respective pads 32, 34. Also, the plates 52, 54, 56, 58, 60, 62, 64, 66 may be formed on the underside of the upper pad 32 instead of the top side as shown in FIG. 2A.

The various films 50, 52, 54, 56, 58, 60, 62, 64, 66 and intervening material of bladder 30 and the fluid contained therein form an array of capacitive sensing elements that are used to detect deformation of the bladder 30 due to occupant weight applied to the foam cushion 16. The bladder layers 30a, 30b and the enclosed silicone fluid act as a dielectric material, and the capacitance of each sensor increases when the separation between the respective upper and lower plates decreases due occupant seat weight. An equivalent circuit of the sensing elements is depicted in FIG. 3B, where the reference numerals used in FIG. 3A have been assigned to corresponding portions of the equivalent circuit.

Figure 3A:
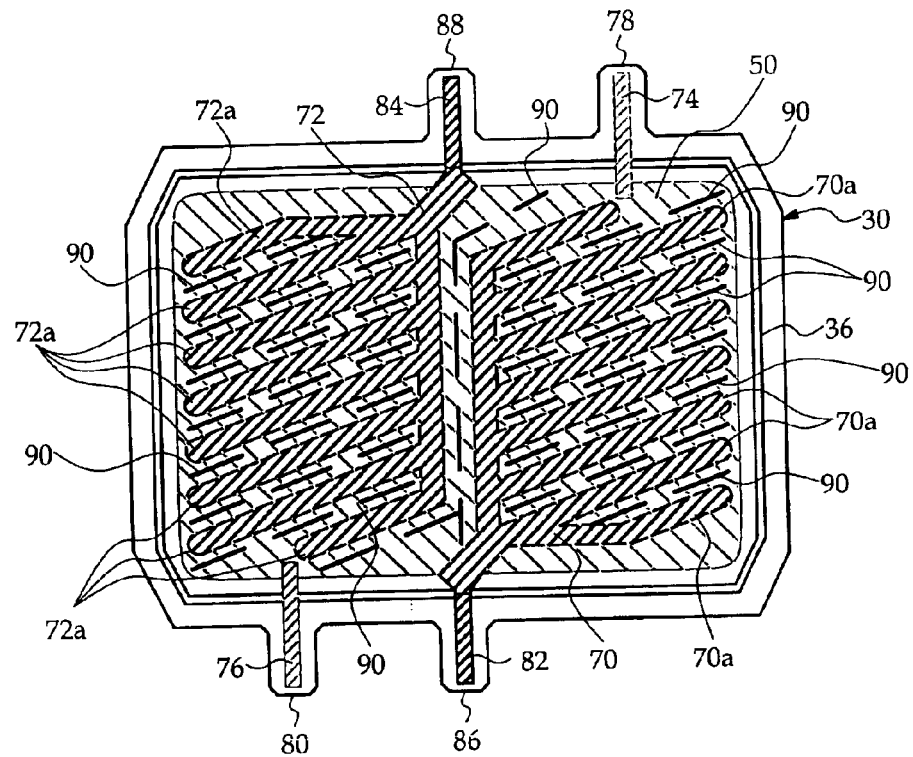
FIG. 3A is a diagram of the bladder of FIG. 1 according to a second embodiment of this invention.
Figure 3B:
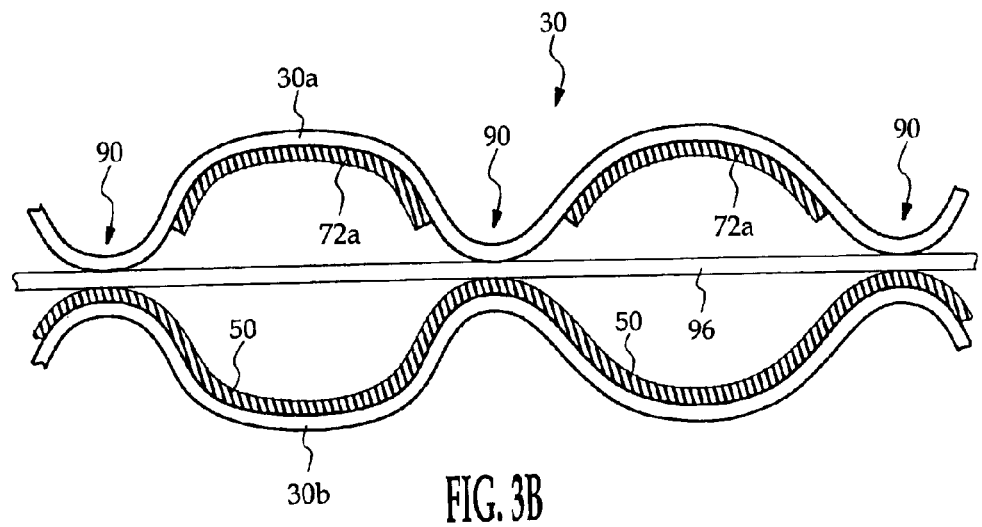
FIG. 3B is a cross-sectional diagram of a portion of a bladder of FIG. 3A.

FIGS. 3A and 3B depict a second embodiment of the invention in which metal films defining an array of two capacitive sensing elements are formed on the surfaces of the upper and lower bladder layers 30a and 30b inside the peripheral weld 36. In the illustrated embodiment, the ground plane film 50 is formed on the interior surface of lower bladder layer 30b, and two metal films 70, 72 are formed on the interior surface of upper bladder 30a. The ground plane film is accessed by the conductor strips 74 and 76 formed on the respective bladder tabs 78 and 80, and the metal films 70 and 72 are accessed by the respective conductor strips 82 and 84 formed on the bladder tabs 86 and 88, respectively. The metal films 70 and 72 are disposed on the right and left halves of bladder 30, and each comprises a number of generally parallel and laterally extending fingers 70a, 72a. Additionally, the upper and lower layers 30a, 30b are intermittently joined by welding between the films 70, 72 and between the fingers 70a, 72a of each film 70, 72, as indicated by the reference numerals 90. FIG. 3B shows a portion of the bladder 30 in cross-section, with the conductor film fingers 70a, 72a formed on the interior surface of upper bladder layer 30a, and the ground plane film 50 formed on the interior surface of lower bladder layer 30b. As illustrated, the weld lines 90 form tubular pockets in which a conductor film finger 70a, 72a is separated from the ground plane conductor 50 by the bladder fluid 94. An additional elastomeric sheet 96 may be utilized as shown to prevent any contact between the conductors formed on the upper and lower bladder layers 30a, 30b.

Figure 4:
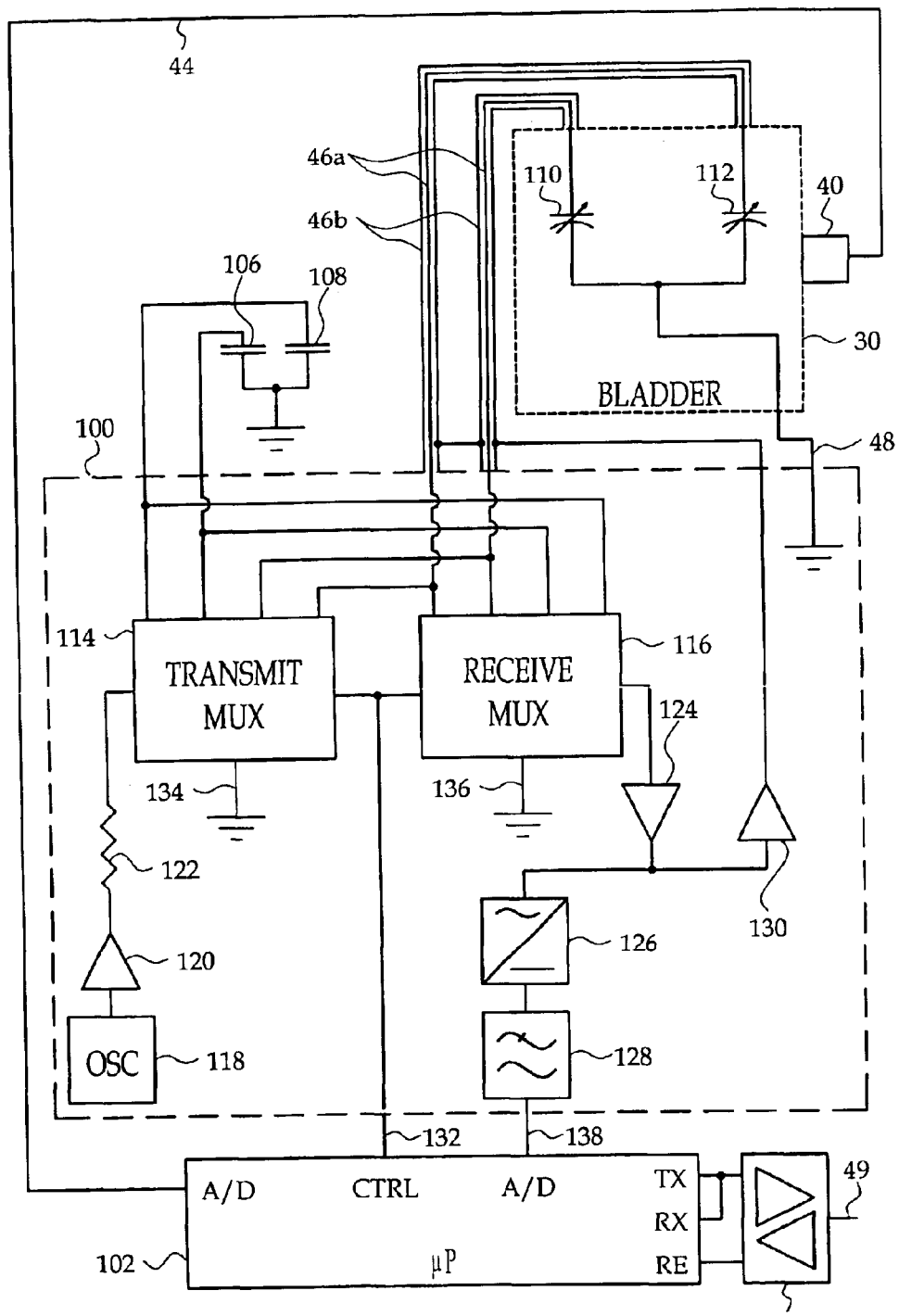
FIG. 4 is a block diagram of the controller of FIG. 1, including a microprocessor.

FIG. 4 is an electrical block diagram of the system 10, including the bladder 30, the pressure sensor 40, and the electronic controller 42. The electronic controller 42 includes an interface circuit 100, a microprocessor 102, a transceiver circuit 104, and a set of two reference capacitors 106 and 108. The bladder sensor elements are depicted as a set of two variable capacitors 110, 112 with a common ground plane 50; the ground plane 50 is coupled to interface circuit 100 via line 48, and the ungrounded capacitor terminals are coupled to interface circuit 100 via the shielded cables 46a and 46b.

The interface circuit 100 may be cost-effectively implemented with an application specific integrated circuit (ASIC) if desired, and operates under the control of microprocessor 102 to successively activate the sensor element capacitors 110, 112 for determining their capacitance values. The sensor cables 46a, 46b are coupled to a pair of multiplexers 114 and 116. The multiplexer 114, referred to herein as a transmit multiplexer, couples a selected seat bladder capacitor 110, 112 to a driver circuit comprising oscillator 118, amplifier 120 and precision resistor 122. The multiplexer 116, referred to herein as a receive multiplexer, couples the selected seat bladder capacitor 110, 112 to a receiver circuit comprising amplifier 124, rectifier 126 and low-pass filter 128. The shields 46b of shielded cables 46a are driven with the received signal via buffer amplifier 130 as shown to minimize the effects of cable capacitance. The microprocessor 102 applies a multi-bit control output (CTRL) to multiplexers 114 and 116 on line 132 for consecutively selecting each of the sensor element capacitors; non-selected capacitor inputs are grounded via lines 134 and 136. The output of the receiver circuit on line 138 is applied to an analog-to-digital (A/D) input port of microprocessor 102, as is the output of pressure sensor 40 on line 44.

In operation, the oscillator 118 energizes the selected sensor element capacitor 110 or 112 through resistor 122, and the resulting capacitor voltage on line 138 is read by microprocessor 102 and converted to a corresponding sensor capacitance value. The reference capacitors 106, 108 are subject to essentially the same environmental conditions (temperature, humidity, etc.) as the bladder sensor capacitors 110, 112, and are also coupled to multiplexers 114, 116; the microprocessor 102 can determine the capacitance of the reference capacitors 106, 108 in the same way as the sensor element capacitors 110, 112 to determine if any offsetting is needed to compensate for the environmental conditions. The microprocessor 102 consecutively selects the sensor element capacitors 110, 112 via CTRL line 130, analyzes the determined capacitance values, and outputs a signal on the data bus 49 as described above in respect to FIG. 1. The data bus 49 may be used for bidirectional communication as shown, with transceiver circuit 104 coupling microprocessor 102 to data bus 49.

Figure 5A:
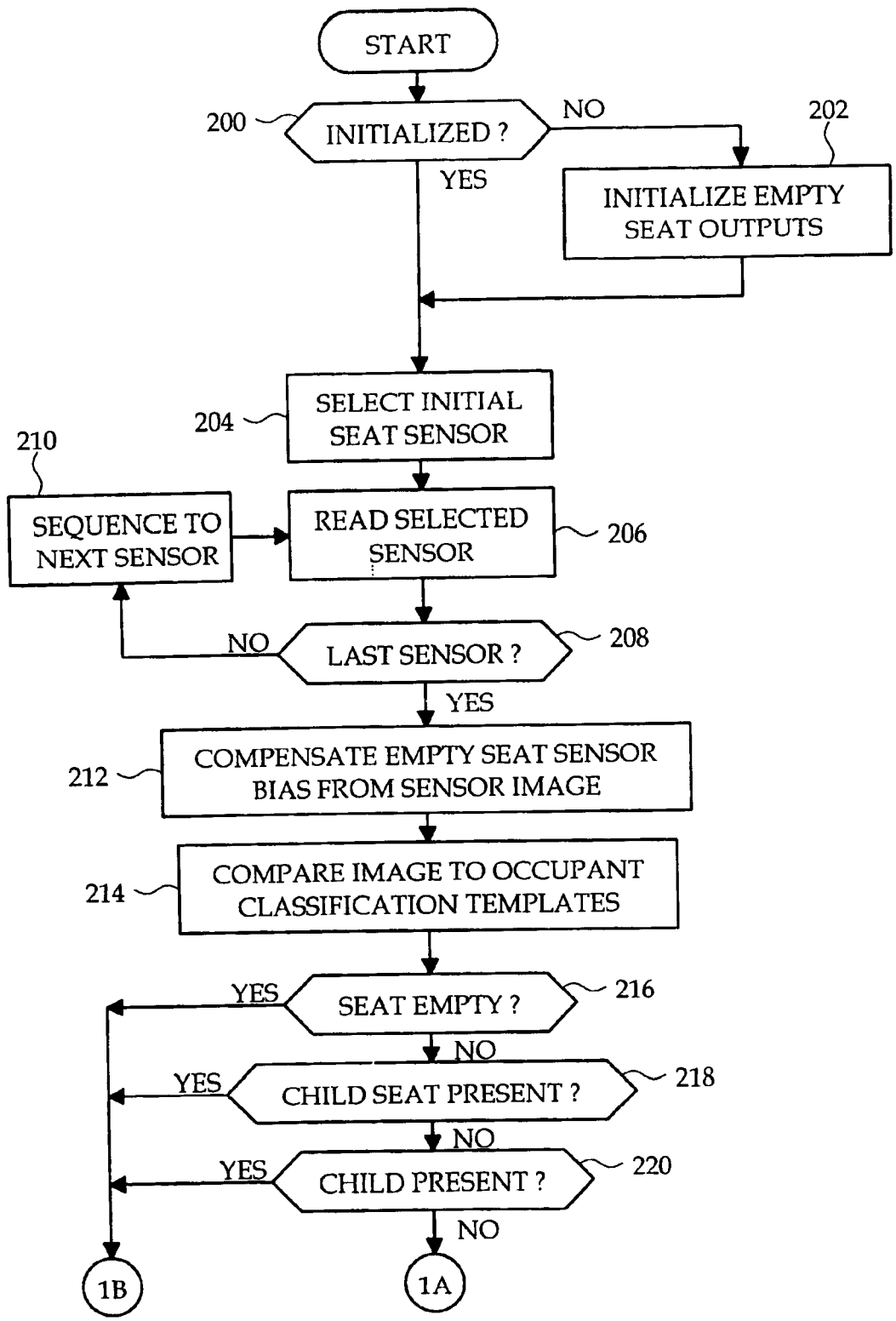
FIGS. 5A and 5B depict a flow diagram representative of a software routine executed by the microprocessor of FIG. 4 according to this invention.
Figure 5B:
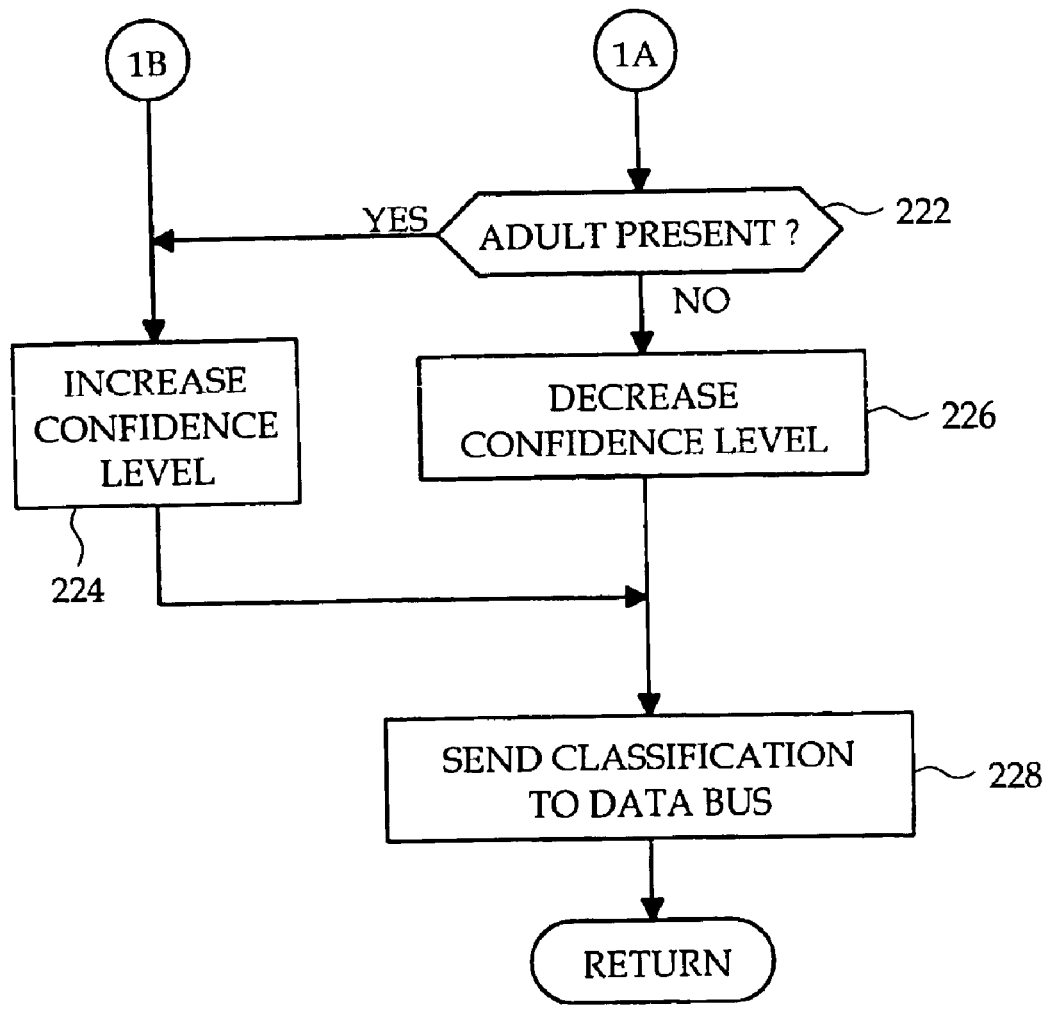

FIGS. 5A–5B together depict a flow diagram representative of a software routine executed by the microprocessor 102 of FIG. 4 for interpreting the sensor information and forming the controller output signal on data bus 49. The illustrated routine may be re-executed during vehicle operation, or on detection of a change in vehicle conditions that might accompany a change in occupant position. Referring to FIG. 5A, the blocks 200 and 202 serve to record the empty seat sensor readings at system initialization. Thereafter, the block 204 selects an initial capacitive sensor, and the block 206 reads the corresponding voltage value on line 138. The blocks 208 and 210 index the selected sensor until all sensors have been read, and then block 212 compensates the sensor readings for the empty seat values recorded at block 202. At block 214, the sensor readings are compared with stored sensor profile templates characteristic of the different possible occupant classifications. If the seat is empty (as determined by block 216), or the sensor readings match one of the occupant classifications designated at blocks 218, 220 or 222, occupant classification is successful, and the block 224 is executed to increase the occupant classification confidence level. On the other hand, the block 226 is executed to decrease the occupant classification confidence level if the blocks 216, 218, 220 and 222 are all answered in the negative. Finally, the block 228 is executed to send the occupant classification determinations to the data bus 49.

In summary, the seat bladder apparatus of the present invention enables improved occupant classification and weight estimation without the cost of multiple pressure sensors. In fact, the illustrated pressure sensor 40 may be omitted if desired to further reduce system cost. While the bladder apparatus has been described in reference to the illustrated embodiments, it should be understood that various modifications in addition to those mentioned above will occur to persons skilled in the art. For example, the number and geometry of sensors may be different than shown; the bladder fluid may be different than disclosed; the bladder may be located above or inside the seat foam; and so on. Furthermore, it should be recognized that the term capacitance as used herein is simply a way of characterizing the change in electric field coupling between the upper and lower conductor films, and any technique for measuring the change in such coupling is essentially equivalent for purposes of this invention. Thus, systems incorporating the above-mentioned and other modifications may fall within the scope of this invention, which is defined by the appended claims.

What is claimed is:

1. Apparatus for classifying an occupant of a seat, the apparatus comprising:
   a fluid-filled elastomeric seat bladder including first and second peripherally sealed elastomeric sheets that deform in response to occupant weight;
   a ground plane conductor film generally conforming to said first elastomeric sheet, and at least one sensor element conductor film generally conforming to said second elastomeric sheet; and
   a controller for detecting a change in capacitance or electric field coupling between said sensor element conductor film and said ground plane conductor film as a measure of deformation of said elastomeric sheets due to occupant weight, and for classifying said occupant based on said detected change.

2. The apparatus of claim 1, further comprising a first pad generally conforming to an exterior surface of said first elastomeric sheet, where said ground plane conductor film is supported on said first pad.

3. The apparatus of claim 1, further comprising a second pad generally conforming to an exterior surface of said second elastomeric sheet, where said sensor element conductor film is supported on said second pad.

4. The apparatus of claim 1, wherein said ground plane conductor film is formed on a surface of first elastomeric sheet inside said bladder.

5. The apparatus of claim 1, wherein said sensor element conductor film is formed on a surface of second elastomeric sheet inside said bladder.

6. The apparatus of claim 1, wherein said ground plane conductor film is formed on a surface of first elastomeric sheet inside said bladder, said sensor element conductor film is formed on a surface of second elastomeric sheet inside said bladder, and said bladder includes a third elastomeric sheet separating the ground plane and sensor element conductor films.

7. The apparatus of claim 1, including a plurality of individual non-contiguous sensor element conductor films generally conforming to said second elastomeric sheet, where said controller detects a change in capacitance or electric field coupling between each of said sensor element conductor films and said ground plane conductor film to form a profile of bladder deformation due to occupant weight, and then classifies said occupant based on said profile.

8. The apparatus of claim 7, wherein said controller determines a capacitance or electric field coupling between said ground plane conductor film and a selected sensor element film, while electrically shorting non-selected sensor element films to said ground plane conductor film.

9. The apparatus of claim 8, wherein said controller selects individual sensor element films in succession.

10. The apparatus of claim 7, further comprising a pressure sensor for measuring fluid pressure in said bladder indicative of occupant weight, wherein said controller determines an occupant weight based on a cumulative change in capacitance or electric field coupling between said ground plane conductor film and said sensor element conductor films, and compares such determined occupant weight with said measured fluid pressure to validate said profile.

* * * * *